G. E. ROHMER, J. F. BOORAEM & R. MORLEY.
EXPANSION BOLT.
APPLICATION FILED FEB. 8, 1912.
1,120,409.
Patented Dec. 8, 1914.
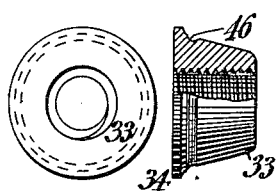 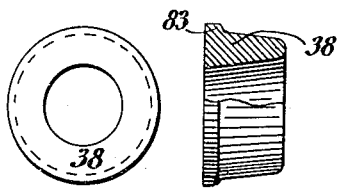 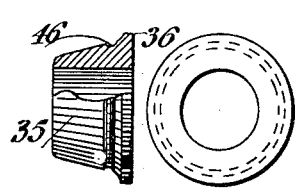
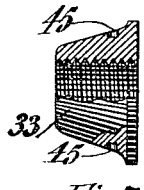 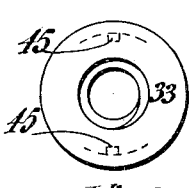 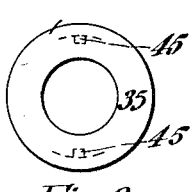 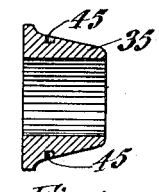
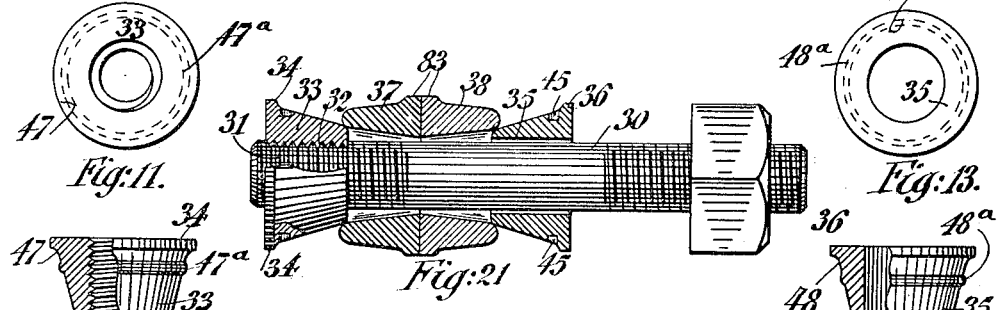 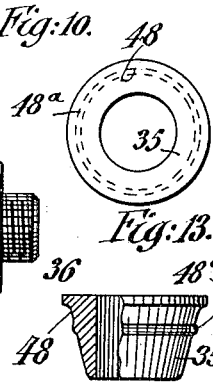
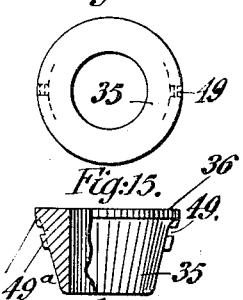 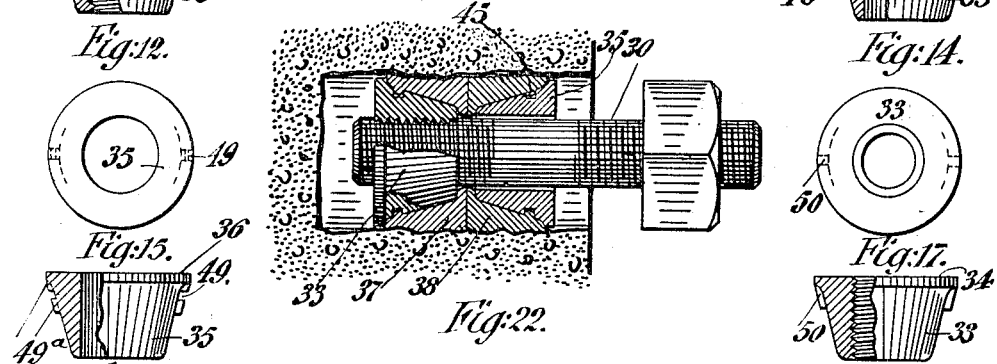 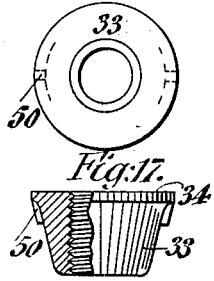
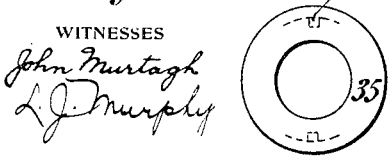 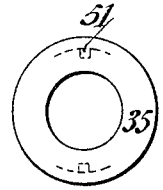 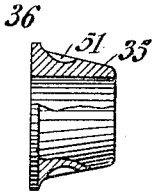
WITNESSES
John Murtagh
L. J. Murphy
INVENTORS
Gabriel E. Rohmer, J. Francis Booraem,
Ralph Morley
BY
Goepel & Goepel
ATTORNEYS

UNITED STATES PATENT OFFICE.

GABRIEL E. ROHMER, OF WOODSIDE, NEW YORK, JOHN FRANCIS BOORAEM, OF GREENWICH, CONNECTICUT, AND RALPH MORLEY, OF BROOKLYN, NEW YORK, ASSIGNORS TO THE BOORAEM & ROHMER PATENT COMPANY, A CORPORATION OF NEW YORK.

EXPANSION-BOLT.

1,120,409.      Specification of Letters Patent.      Patented Dec. 8, 1914.

Application filed February 8, 1912. Serial No. 676,342.

*To all whom it may concern:*

Be it known that we, GABRIEL E. ROHMER, a citizen of the United States of America, and residing in Woodside, in the county of Queens and State of New York, JOHN FRANCIS BOORAEM, a citizen of the United States of America, residing in Greenwich, in the county of Fairfield and State of Connecticut, and RALPH MORLEY, a citizen of the United States of America, residing in the borough of Brooklyn, county of Kings, and State of New York, have invented certain new and useful Improvements in Expansion-Bolts, of which the following is a specification.

This invention relates to expansion bolts and has for its object to provide means by which the male or expanding member is keyed to the female or expansible member after the unit has been assembled so as to prevent the disengagement of the members of the unit after their engagement and at the same time permit the bolt to be withdrawn from the unit.

For this purpose our invention consists of an improved expanding member having recesses therein adapted to be engaged by the material forming the expansible member which is forced into said recesses, and thereby key the parts together.

The invention consists further in providing the expansible member with a friction rim to enable the member to readily adapt itself to holes of varying diameter resulting from the same drill.

In the accompanying drawings, Figure 1 represents an end-view of an expanding member embodying our invention, Fig. 2 represents a side-view, partly in section and partly in elevation of the same member, Fig. 3 shows an end-view of an expansible member provided with a friction-rim made in accordance with our invention, Fig. 4 is a side-view, partly in elevation and partly in section of the form shown in Fig. 3, Fig. 5 is a side-view, partly in section, partly in elevation, of another embodiment of the expanding member, Fig. 6 is an end-view of the same, Fig. 7 is a side-view, partly in section and partly in elevation of still another embodiment, Fig. 8 is an end-view of the same, Figs. 9 and 10 are respectively, an end-view and a section of another embodiment, Fig. 11 is an end-view, Fig. 12 is a section, partly in section and partly in elevation, of a modified form of expanding member, Fig. 13 is an end-view, Fig. 14 is a view of the drawings in section and partly in elevation, of still another modified form of expanding member, Fig. 15 is an end-view, Fig. 16 is a section, partly in section and partly in elevation of still another modified form, Fig. 17 is an end-view, Fig. 18 is a view, partly in section and partly in elevation, of another modified form, Fig. 19 is an end-view, Fig. 20 is a view, partly in section and partly in elevation, of another modified form, showing a recess of large curvature, Fig. 21 is a side-view, partly in section and partly in elevation, of a bolt having two expansible members back to back engaged by two expanding members, provided with the improved recess, and Fig. 22 is a view, partly in section and partly in elevation of the same members as shown in Fig. 21, but showing them in engaging position.

Similar letters of reference indicate corresponding parts throughout the several figures of the drawings.

Referring to the drawings, the bolt 30 is provided with screw-threads 31 to engage screw-threads 32 of the male or expanding member 33 which is preferably conical in shape and provided with a circumferential inclosing flange 34. The other male or expanding member 35 is also substantially conical in shape and is provided with a circumferential inclosing flange 36. The male or expanding member 35 is not provided with screw-threads but fits loosely on the bolt 30 and is movable thereon by means of a pressure applied to the exterior side of the member 35. The expansible or female members 37 and 38 are arranged back to back, and are inclosed by the male or expanding members and by their flanges and each have a circumferential flange 83. By moving the expanding members 33 and 35 toward each other, the expansible members 37 and 38 are compressed therebetween and are forced against the walls of the hole and against all parts of the expanding members and bolt which lie between and inclosed by the flanges 34 and 36. In certain cases it has been found in this form of construction that it is desirable to remove the bolt from the unit without, however, changing the positions of the other parts of the unit relatively to each other. In certain cases, the male or expanding member 33 was likely to disengage itself from the expansible member and the same thing was likely to occur with the male or expanding member 36. In case the expanding member 36 became disengaged from the expansible member it could very easily be replaced, but this same facility of replacement was not possible with the inner expanding member, so that when the bolt was once removed it was difficult, if not impossible, to replace the same in exactly the position to insure the true engagement of the interior screw-threads of the bolt with the interior screw-threads of male or expanding member.

In order to prevent the disengagement of the expanding members the improvement consists in providing the expanding members with recesses or projections into or around which the material of the expansible member is forced when the expansible member is compressed between the expanding members. By the material being forced into the recesses or around projections the expanding member is held securely in position and will not become disengaged when the bolt is removed.

In the construction illustrated for the screw-threaded expanding member 33 in Figs. 1 and 2, and for the smooth-bore expanding member 35, in Figs. 5 and 6, an annular groove 46 is provided in the outer surface of the member 33 or 35, adjacent to the flange 34 or 36 respectively. This groove forms the recess into which the material of the corresponding expansible member 37 or 38 is adapted to be crowded.

As shown in Figs. 7 to 10 inclusive, as also in Figs. 21 and 22, recesses 45 are formed at diametrically opposite points on the tapering outer surface of the expanding member 33 or 35, adjacent to the flange 34 or 36 respectively.

According to Figs. 11 to 14 inclusive, the expanding member 33 or 35 is formed, at a slight distance from the flange 34 or 36 respectively, with a circumferential annular rib 47ª or 48ª respectively, thereby forming between the flange 34 or 36 and the rib 47ª or 48ª, an annular groove 47 or 48 respectively corresponding to the groove 46 of Figs. 1, 2, 5 and 6. Again, in Figs. 15 and 16, the member 35 is shown provided at diametrically opposite points with sets of projections 49ª, each set comprising two projections alining lengthwise and separated so as to leave a space 49. One of the projections 49ª is contiguous to the flange 36. It will be obvious that the same construction may be applied to the threaded member 33.

The member 33 shown in Figs. 17 and 18 is provided at each of two diametrically opposite points, with a single longitudinal projection 50 contiguous to the flange 34. The same construction may of course be applied to the member 35. Finally, the expanding member 35 represented in Figs. 19 and 20 is provided at diametrically opposite points of its outer surface, adjacent to the flange 36, with recesses 51 of large curvature lengthwise of said member. Evidently the member 33 may be provided with recesses of the same character.

In every one of the constructions illustrated by Figs. 1, 2 and 5 to 22 inclusive, those surfaces of the expanding members which are adapted to engage the expansible members, are provided with locking formations (recesses in most of the constructions shown, although projections may be used exclusively as in Figs. 17 and 18) with which the expansible material becomes interlocked in the application of the bolt, as shown in Fig. 22. It then becomes possible to unscrew the bolt proper 30 from the member 33 without disturbing the relation of the other parts (33, 35, 37, 38) to each other. Thus the bolt 30 may be readily re-inserted, since the other parts will be found in their original holding position.

Figs. 3, 4, 21 and 22 illustrate another feature of our invention, which relates to the formation of a friction rim on the expansible member. As stated above, each of the members 37, 38 is provided with a circumferential flange 83. Fig. 21 shows that these flanges are located at the abutting ends of the two expansible members. The two flanges together form a friction rim which engages the wall of the hole in which the expansion bolt is set. The material of the members 37, 38 being expansible and compressible, the friction rim will become flattened out as the material of said members is forced outward against the wall of the hole (see Fig. 22) by the pressure exerted axially of the expanding members 33, 35. The expansible member will thus readily adapt itself to holes of different diameters, within certain limits.

Various modifications may be made without departing from the nature of our invention as set forth in the appended claims.

We claim:

1. In an expansion bolt, expanding members, expansible members of a material capable of being molded, engaged by said expanding members, and a bolt proper detachably connected with one of said expanding members, said expanding members being provided with locking formations to be engaged by the expansible members, capable of being molded thereon to preserve their connection when the bolt proper is removed.

2. In an expansion bolt, an expasible member of a material capable of being molded, and an expanding member adapted for engagement with said expansible member and provided with a locking formation in its engaging surface, said expansible member capable of being molded around the expanding member and on the locking formation.

3. In an expansion bolt, an expansible member, an expanding member adapted for engagement with said expansible member, and recessed in its engaging surface, said expansible member capable of being molded around the expanding member and of being forced into the recess.

4. In an expansion bolt, an expanding member, an expansible member of a material capable of being molded adapted for engagement with said expanding member of less diameter than the diameter of the hole, and provided with a friction rim extending therefrom adapted to engage the wall of the hole into which the expansion bolt is fitted, and a bolt proper connected with said expanding member.

5. In an expansion bolt, comprising conical members with their beveled portions directed toward each other, said conical members being provided with locking formations, and expansible members of a material capable of being molded having their base portions adjacent each other, and each provided with a rim contacting with the wall of the hole, said rim acting to guide the expansible member, and the expansible member being adapted to be forced into the locking formations in the conical members.

6. In an expansion bolt, comprising an expansible member of a material capable of being molded, conical members engaging each end of the expansible members provided with locking formations, and a bolt for the conical members, the said expansible member being adapted to be molded between the conical members and molded into the locking formations in the conical members to secure a tight hold therewith, and enable the bolt to be removed without disengagement of the conical members and expansible member.

7. In an expansion bolt, expanding members, expansible members arranged to engage each other and to be fitted between said expanding members, said expansible members being provided at their abutting ends, with peripheral flanges adapted to form a friction rim, and a bolt proper connected with one of said expanding members.

In testimony, that we claim the foregoing as our invention, we have signed our names in presence of two subscribing witnesses.

GABRIEL E. ROHMER.
J. FRANCIS BOORAEM.
RALPH MORLEY.

Witnesses:
 JOHN MURTAGH,
 L. J. MURPHY.